UNITED STATES PATENT OFFICE.

BENJAMIN TALBOT, OF PENCOYD, PENNSYLVANIA.

MANUFACTURE OF OPEN-HEARTH STEEL.

SPECIFICATION forming part of Letters Patent No. 599,290, dated February 15, 1898.

Application filed June 22, 1897. Serial No. 641,810. (No specimens.)

*To all whom it may concern:*

Be it known that I, BENJAMIN TALBOT, a subject of the Queen of Great Britain and Ireland, and a resident of Pencoyd, Montgomery county, Pennsylvania, have invented certain Improvements in the Manufacture of Open-Hearth Steel, of which the following is a specification.

The object of my invention is to facilitate and cheapen the manufacture of open-hearth steel, an object which I attain in the manner hereinafter set forth.

Previous to my invention the customary method of making steel in the ordinary Siemens regenerative or other open-hearth furnace had been to melt the pig-iron or pig-iron and scrap in the furnace and to continue the operation therein until the impurities in the charge had been removed and said charge converted into steel of the desired quality, the furnace being then tapped and the hearth completely emptied of its contents prior to being charged again with fresh materials for another heat.

My invention consists in retaining in the furnace a portion of the mass of molten and purified metal having a covering of slag through which a charge of impure or partially-purified molten metal is poured. When the slag is not heavily charged with impurities, I prefer to leave some of this slag in the furnace with the body of purified metal retained therein; but whether a portion of the slag is so retained or not I provide the bath of purified metal remaining in the furnace with a covering of slag before introducing the supply of impure or partially-purified molten metal into the furnace.

When operating with a furnace having a basic or neutral hearth or lining, I prefer to proceed as follows:

In any ordinary form of tipping furnace—that is to say, one which has its delivery-spout at or above the level of the liquid bath and which is capable of being tilted so as to pour off either metal or slag through one or more spouts—I make a heat of steel in the usual way, but of smaller weight than the full capacity of the furnace—say about sixty per cent. of such capacity; but instead of pouring out this heat of metal when it has been properly purified I pour into it through its slag covering a quantity—say about forty per cent. of the furnace capacity—of liquid metal, which may be either pig-iron obtained directly from the blast-furnace or other furnace or cupola or it may be pig-iron desiliconized or partially purified in any available manner. This metal coming into contact with the liquid basic slag and highly-heated bath of purified metal in the furnace is rapidly purified and its temperature is raised so as to admit of its being successfully cast.

The percentage of added impure or partially-purified metal in respect to the purified metal in the furnace may be varied, the rule being that the smaller the percentage of impure metal added to the purified charge in the furnace the quicker will the purification of this added metal be effected. From time to time during the purification of this added metal further basic additions are made when necessary, and as soon as the entire bath of metal is sufficiently purified the furnace is tilted and the desired percentage of the entire charge—say a percentage equal, or thereabout, to the added charge of impure or partially-purified metal—is poured into the ladle, the usual deoxidizing addition of ferromanganese, spiegel, or the like being introduced into the metal in the ladle or in any other convenient and economical manner. A greater or less quantity of the slag, according to the amount of impurity contained therein, is flowed off either before or after the metal is poured. Fresh basic additions, such as oxid of iron and lime or limestone, either liquid or solid, are added to the molten bath of purified metal left in the furnace and a fresh supply of impure or partially-purified metal is then poured into the furnace and the operation before described is repeated.

The pouring of the fresh supply of impure or partially-purified molten metal through a mass of basic slag I consider to be an essential step in the process of purification, and hence in carrying out my invention I always provide the bath of purified metal remaining in the furnace with a covering of such basic slag before adding the partially-purified metal thereto.

The economy of my improved process arises from the fact that the purification of the added charge is effected in considerably less time than would be required for its purification if treated alone, for when the charge of impure or partially-purified metal is added to the charge of pure metal remaining in the furnace the percentage of impurity in the entire bath is proportionately reduced, and the slag operating throughout the extended surface presented by the full bath rapidly eliminates the impurities therefrom, the purification being, as before stated, further facilitated by the pouring of the impure or partially-purified charge through the basic slag in adding the same to the purified metal remaining in the furnace. As the impure or partially-purified charge is, moreover, of less specific gravity than the pure charge contained in the furnace it will rise to the top of the latter and the impurities will be acted upon by the slag and furnace-gases more quickly and with better effect than if they were distributed throughout the entire depth of the charge, and for this reason also, in addition to those above given, the purifying action is expedited.

Solid scrap or pig-iron may be charged with the liquid metal, especially when the latter has a considerable percentage of silicon, which by its oxidation will contribute heat to the charge; but unless such solid additions are cheaper than the liquid portion of the charge it is not advisable to use them to such an extent as to appreciably lower the temperature and fluidity of the bath, as this would delay the operation.

When operating with an acid-lined furnace, I proceed in the same manner as before described excepting that the slag does not contain sufficient free base to attack the lining beyond the susceptibility of ready repair during the running of the furnace.

By the term "purification" as used in my specification and claims is not necessarily meant the complete elimination of the impurities from the iron, but only such elimination as will result in a product of the desired grade—that is to say, one which will be theoretically known as "steel" by reason of the percentage of its carbon contents whether after treatment of the product is or is not resorted to for special purposes.

Having thus described my invention, I claim and desire to secure by Letters Patent—

1. The mode herein described of making open-hearth steel, said mode consisting in providing a furnace with a partial charge of purified molten metal having a covering of slag, pouring a charge of impure or partially-purified molten metal through said slag and into the partial charge of purified molten metal in the furnace, and, after the purification of the mixed charge is completed, drawing off a portion of the same, leaving the remainder of the molten charge in the furnace for admixture with a fresh molten charge of impure or partially-purified metal, substantially as specified.

2. The mode herein described of manufacturing open-hearth steel, said mode consisting in providing a furnace with a partial charge of purified molten metal, covering the same with an oxidizing slag, pouring a fresh charge of impure or partially-purified molten metal through the said oxidizing slag and into the bath of pure molten metal contained in the furnace, continuing the oxidizing operation until the entire bath is purified and then withdrawing a portion of the purified molten metal, leaving the remainder of the same in the furnace for admixture with a fresh charge of impure or partially-purified molten metal, substantially as specified.

In testimony whereof I have signed my name to this specification in the presence of two subscribing witnesses.

BENJAMIN TALBOT.

Witnesses:
F. E. BECHTOLD,
JOS. H. KLEIN.